United States Patent
Chen

(10) Patent No.: US 6,819,097 B2
(45) Date of Patent: Nov. 16, 2004

(54) ELECTRIC POWER EVALUATION SYSTEM AND METHOD THEREOF

(75) Inventor: Ching-Yi Chen, Hsinchu (TW)

(73) Assignee: Macronix International Co., Ltd., Hsinchu (TW)

(*) Notice: Subject to any disclaimer, the term of this patent is extended or adjusted under 35 U.S.C. 154(b) by 0 days.

(21) Appl. No.: 10/604,130

(22) Filed: Jun. 27, 2003

(65) Prior Publication Data

US 2004/0027114 A1 Feb. 12, 2004

(51) Int. Cl.[7] .............................................. G01R 11/32
(52) U.S. Cl. ................... 324/142; 324/103 R; 705/412
(58) Field of Search ................................ 324/142, 103, 324/765, 158.1; 700/140, 107, 91; 705/10, 412

(56) References Cited

U.S. PATENT DOCUMENTS

| | | | | |
|---|---|---|---|---|
| 5,758,331 A | * | 5/1998 | Johnson | 705/412 |
| 5,930,773 A | * | 7/1999 | Crooks et al. | 705/30 |
| 6,618,709 B1 | * | 9/2003 | Sneeringer | 705/412 |
| 6,631,309 B2 | * | 10/2003 | Boies et al. | 700/291 |

* cited by examiner

*Primary Examiner*—Minh Tang
*Assistant Examiner*—Tung X. Nguyen
(74) *Attorney, Agent, or Firm*—Jiang Chyun IP Office

(57) ABSTRACT

An electric power evaluation system and a method thereof. The system comprises an input module, a database, an analysis module, a contract generation module, and an output module. In this method, at first, the input module receives a condition input by the user. Then, the analysis module calculates and generates an optimum total power rate according to the received condition as well as the historical record of the total power rate, the basic power rate, the additional fee for excess usage, and the circuitry allowance stored in the database. Afterwards, the contract generation module generates a contract having an optimum capacity based on the optimum total power rate. Finally, the output module outputs the contract to the user. Since the present invention considers using the basic power rate, the additional fee for excess usage, and the circuitry allowance to calculate the contracted capacity, the optimum contracted capacity can be obtained.

19 Claims, 2 Drawing Sheets

ELECTRIC POWER EVALUATION SYSTEM AND METHOD THEREOF

CROSS REFERENCE TO RELATED APPLICATIONS

This application claims the priority benefit of Taiwan application serial No.91117853, filed on Aug. 8, 2002.

BACKGROUND OF INVENTION

1. Field of Invention

The present invention generally relates to an electric power evaluation system and a method thereof, and more particularly, to a system and a method thereof that calculates and generates an optimum contracted capacity by taking account of the basic power rate, the additional fee for excess usage, and the circuitry allowance.

2. Description of Related Art

The demand for electricity usage has increased significantly in Taiwan recently, and the shortage of the electricity supply is getter worse day by day. Electric power is characterized by having generation and consumption occur at the same time and cannot be substantively stored. Moreover, the consumption of electricity by the user varies depending on variant living habits, operating manners, and the different seasons. Therefore, in order to avoid idle and waste due to the invested capacity not being able to fulfill the electricity demand or over capacity of the equipment, the investment of the electric power generation and electric power supply capacity has to take into consideration the maximum demand of the user and the contracted capacity of the electricity to be used. Therefore, Taiwan Power Company (TPC) calculates and regulates the contracted capacity, and the calculated electricity demand capacity is provided to the user who has a high volume electricity demand, so that sufficient equipment can be planned and invested in to fulfill the electricity demand from users.

For the semiconductor industries, the expenditure of the power rate plays a significant role in the operating cost. Wherein, besides the electricity needed by the production assembly line, the equipment needed to maintain the dust-free room environment (e.g. temperature, humidity, and pressure), such as compressed dry-air manufacture device, vacuum device, ice-water device, and boiler, further demand high volume electric power. Therefore, it is important to reduce the rate of power expenditure. Besides reducing unnecessary waste through efficient workshop management, due to the characteristics of the contracted capacity policy and the complicated pricing regulations provided by TPC, it is important for electronic industries to determine optimum contracted capacity, so that unnecessary expenditure of electricity can be avoided.

The electric power generation and electric power supply equipment invested by the electric power vendor has the burden of fixed cost expenditure for the new installation, operation, depreciation, maintenance, interest, and taxes. In order to fairly distribute the fixed cost to be shared by the electric power vendor and the user, user electricity demand is generally a factor used for pricing by the electric power vendor. That is, the amount of capacity contracted by the user is used to collect the basic power rate.

TPC is a major electric power vendor in Taiwan. Since the electricity pricing table defined by TPC is complicated, it is quite important to calculate an optimum contracted capacity. For high voltage users, the power rate mainly comprises the basic power rate, the floating power rate, other discounts, and the additional costs (such as the additional fee for excess usage, the circuitry allowance, the power regulation fee, and late payment). The total payable power rate is based on the following formula:Total payable power rate=Total power rate+Sales tax=(Basic power rate+Floating power rate+Additional fee for excess usage+Circuitry allowance+Power regulation fee+Late payment+Overpayment/Underpayment+Air condition additive or Exemption of agriculture power)+Sales tax.

The basic power rate, the OLE_LINK1 additional fee for excess usageOLE_LINK1, and the circuitry allowance are related to the contracted capacity, and so are described in detail hereinafter.

The basic power rate is expenditure calculated from the regular capacity contracted between the user and the electric power vendor. For example, if the monthly regular capacity contracted between the user and TPC is 10000 KW, and each KW costs NT$153, the basic power rate is NT$153×10000=NT$1530000.

After the regular capacity is contracted between the user and the electric power vendor, once the maximum amount of the regular electricity demand (the instant amount of the electricity demand) exceeds the regular contracted capacity, the electric power vendor charges the portion of the electricity beyond the regular contracted capacity at a higher rate, that is the additional fee for excess usage. For example, TPC charges the portion of the electricity beyond the user's regular contracted capacity with a rate of two times of the basic power rate. When the monthly regular contracted capacity between the user and TPC is 10000 KW, if the maximum amount of the regular electricity demand is 11000 KW, and the basic power rate for each KW is NT$153, the additional fee for excess usage is NT$153×2×(11000 10000)=NT$306000.

When the electric power supply condition is changed or there is a requirement to add new equipment, the expenditures are shared by the electric power vendor and the user, this is the circuitry allowance. In other words, the user has to pay the circuitry allowance to the electric power vendor when the user intends to increase the regular contracted capacity, and the expenditure paid by the user is varied for each different electric power supply method. Moreover, although it is free for a user to reduce the regular contracted capacity, the user has to afterwards pay the equipment maintenance fee when it is intended to increase the regular contracted capacity back to the original level.

In summary, for power rate expenditure, it is quite important to calculate an optimum contracted capacity. One of the conventional electric power evaluation methods is disclosed in "The strategic analysis of the contracted capacity for TPC and a real case study for a semiconductor manufactory" by Chien Jan-Fu and others issued by the Technology Journals of Republic of China in 1999. Since this method only considers using the basic power rate and the additional fee for excess usage to calculate the contracted capacity, and does not take account of the circuitry allowance, the optimum contracted capacity cannot be obtained.

SUMMARY OF INVENTION

Therefore, the present invention provides an electric power evaluation system and a method thereof. Since the present invention considers using the basic power rate, the additional fee for excess usage, and the circuitry allowance to calculate the contracted capacity, the optimum contracted capacity can be obtained.

In order to achieve the objective mentioned above, the present invention provides an electric power evaluation system. The system comprises an input module, a database, an analysis module, a contract generation module, and an output module. The input module receives a condition input by the user. The database stores the historical record of the total power rate, the basic power rate, the additional fee for excess usage, and the circuitry allowance. The analysis module calculates and generates an optimum total power rate according to the condition as well as the historical record of the total power rate, the basic power rate, the additional fee for excess usage, and the circuitry allowance. The contract generation module generates a contract having an optimum capacity based on the optimum total power rate. The output module outputs the contract to the user.

In a preferred embodiment of the present invention, the condition comprises an electricity-engaged duration.

In a preferred embodiment of the present invention, the database stores a plurality of electric power vendor brands. The condition comprises one of the electric power vendor brands, and each electric power vendor brand has a specific pricing regulation.

In a preferred embodiment of the present invention, the input module can be a keyboard or a mouse.

In a preferred embodiment of the present invention, the database is stored in a storage device.

In a preferred embodiment of the present invention, the analysis module can be software stored in the storage device or an Application Specific Integrated Circuit (ASIC).

In a preferred embodiment of the present invention, the contract generation circuit can be software stored in the storage device or an Application Specific Integrated Circuit (ASIC).

In a preferred embodiment of the present invention, the output module is a display device.

The present invention provides an electric power evaluation method. The method comprises the steps of: at first, receiving a condition input by the user; then, calculating and generating an optimum total power rate according to the condition as well as the historical record of the total power rate, the basic power rate, the additional fee for excess usage, and the circuitry allowance; afterwards, generating a contract having an optimum capacity based on the optimum total power rate; finally, outputting the contract to user.

In a preferred embodiment of the present invention, the condition comprises an electricity-engaged duration.

In a preferred embodiment of the present invention, the historical of the total power rate, the basic power rate, the additional fee for excess usage, and the circuitry allowance are stored in the database. The database further stores a plurality of electric power vendor brands. The condition comprises one of the electric power vendor brands, and each electric power vendor brand has a specific pricing regulation.

In summary, since the present invention considers using the basic power rate, the additional fee for excess usage, and the circuitry allowance to calculate the contracted capacity, the optimum contracted capacity can be obtained.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

Figure 1:
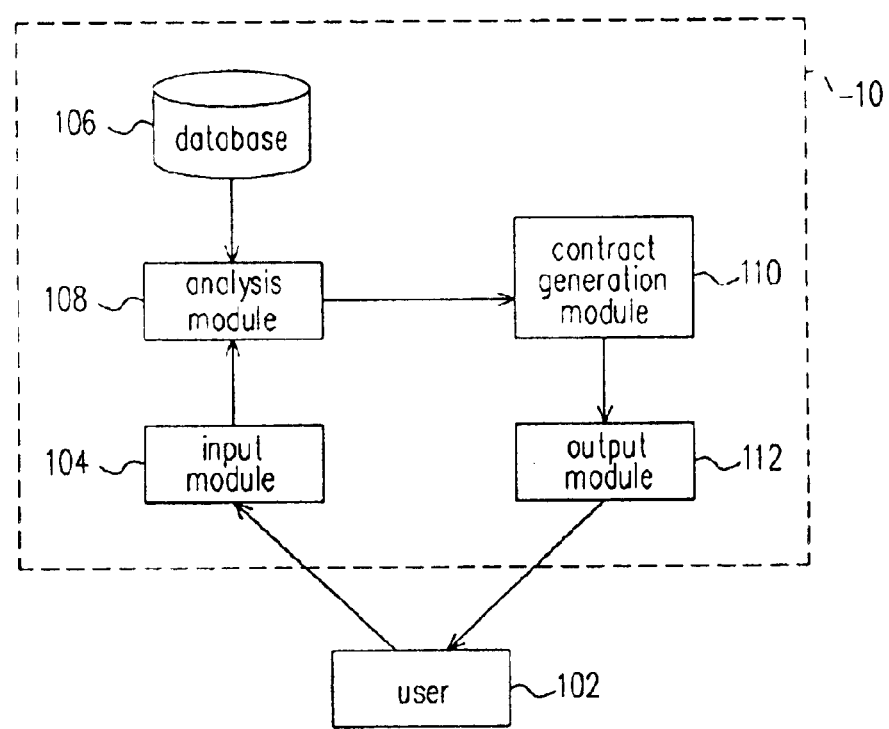
FIG. 1 schematically shows a block diagram of the electric power evaluation system of a preferred embodiment according to the present invention.

FIG. 1 schematically shows a block diagram of the electric power evaluation system 10 of a preferred embodiment according to the present invention. The system 10 comprises an input module 104, a database 106, an analysis module 108, a contract generation module 110, and an output module 112. In the preferred embodiment, the system 10 can be performed by any type of the computer device, such as the personal computer, workstation, or other device of the same kind. It is well known that the computer device should at least comprise a processor, a memory, a storage device, an input device, and an output device. More detailed, the processor can be the central processing unit (CPU), the microprocessor (MPU), or an element of the same kind. The memory can be the Dynamic Random Access Memory (DRAM), the flash memory, or the element of the same kind. The storage device can be the hard disk, the Compact-Disk Read-Only-Memory (CD-ROM), or a storage device of the same kind. The input device can be the keyboard, the mouse, or a device of the same kind. The output device can be the Cathode Ray Tube (CRT), the Liquid Crystal Display (LCD), or a display device of the same kind. The function of each part of the system 10 is described in detail hereinafter.

The input module 104 receives a condition input by the user 102. That is, the user 102 can input the desired-input condition to the analysis module 108 via the input module 104. Wherein, the input module 104 can be a keyboard, a mouse, or the device of the same kind. The condition input by the user 102 comprises an electricity-engaged duration and an electric power vendor brand.

The database 106 stores the historical record of the total power rate, the basic power rate, the additional fee for excess usage, the circuitry allowance, and the electric power vendor brand. Each electric power vendor brand has its specific pricing regulation. Therefore, the pricing regulation is varied for different electric power vendor brands. The database 106 is stored in the storage device. Moreover, the storage device can be the hard disk, the CD-ROM, or a storage device of the same kind.

The analysis module 108 calculates and generates an optimum total power rate consisting of the basic power rate, the additional fee for excess usage, and the circuitry allowance according to the condition received by the input module 104 as well as the historical record of the total power rate, the basic power rate, the additional fee for excess usage, the circuitry allowance, and the electric power vendor brand. The analysis module 108 can be software stored in the storage device, and the software is executed by the processor. After the analysis module 108 is loaded, the processor can achieve the function of the analysis module 108 via the elements in the computer device. However, it will be apparent to one of the ordinary skill in the art that hardware module such as the Application Specific Integrated Circuit (ASIC) can be used to perform the function of the analysis module 108 without departing from the spirit of the present invention.

The contract generation module 110 generates a contract having an optimum capacity based on the optimum total power rate. Similarly, the contract generation module 110 can be software stored in the storage device, and the software is executed by the processor. After the contract generation module 110 is loaded, the processor can achieve the function of the contract generation module 110 via the elements in the computer device. However, it will be apparent to one of the ordinary skill in the art that the hardware module such as the Application Specific Integrated Circuit (ASIC) can be used to perform the function of the contract generation module 110 without departing from the spirit of the present invention.

The output module 112 outputs the contract to the user 102. That is, the output module 112 displays the contract with the optimum capacity, so that the user 102 knows the content of the contract. The output module 112 can be the Cathode Ray Tube (CRT), the Liquid Crystal Display (LCD), or a display device of the same kind.

Figure 2:
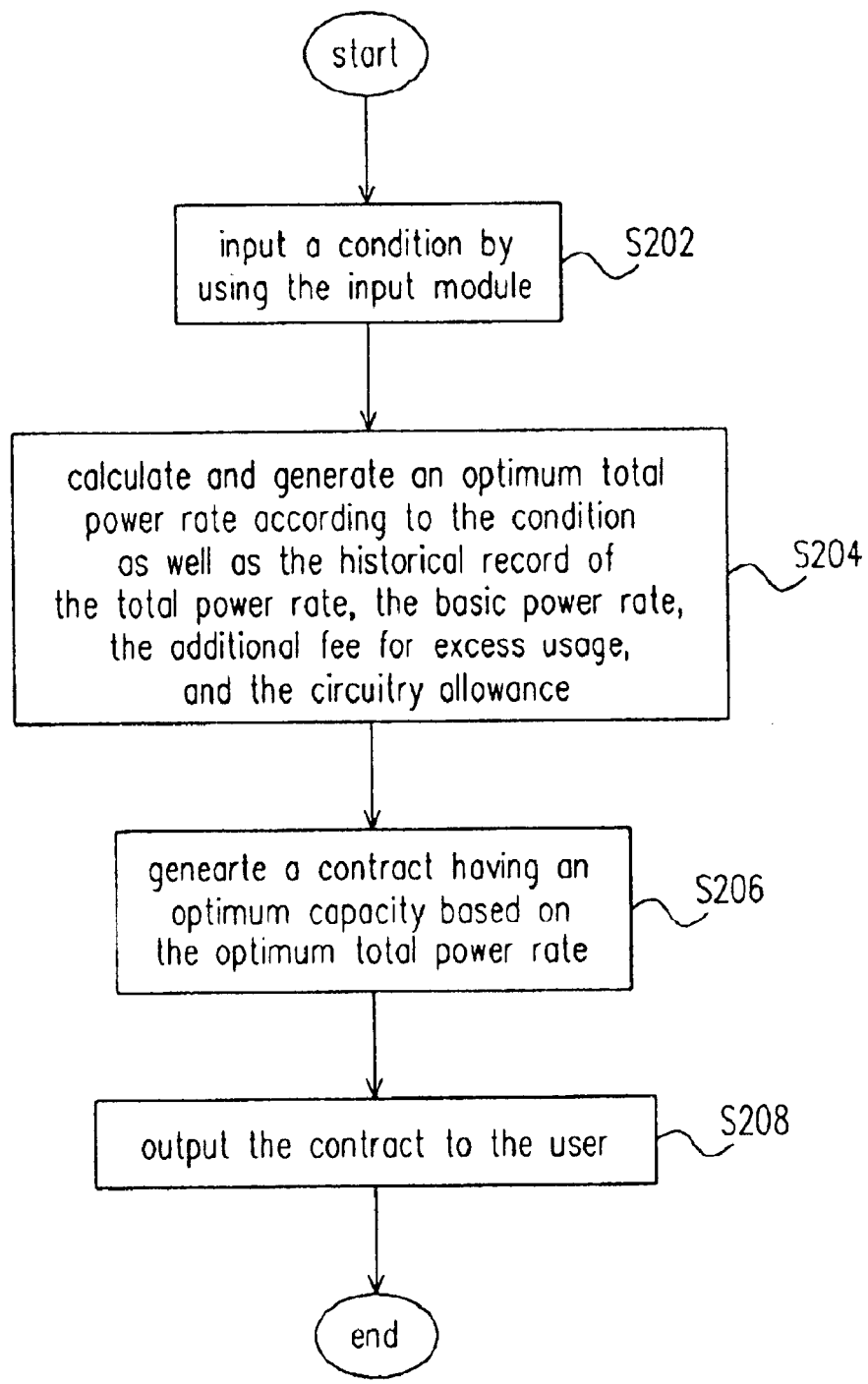
FIG. 2 schematically shows a flow chart of the electric power evaluation method of a preferred embodiment according to the present invention.

FIG. 2 schematically shows a flow chart of the electric power evaluation method of a preferred embodiment according to the present invention. The method is described in detail hereinafter accompanying with FIG. 1. In this method, at first, the input module 104 receives a condition input by the user 102. When the optimum total power rate is calculated, the user 102 can input the condition composed of the electricity-engaged duration and the electric power vendor brand. For example, the user 102 can input the electricity-engaged duration as from January 2002 to December 2002, and the electric power vendor brand as TPC (as step s202). Then, the analysis module 108 calculates and generates an optimum total power rate composed of the basic power rate, the additional fee for excess usage, and the circuitry allowance according to the received condition as well as the historical record of the total power rate, the basic power rate, the additional fee for excess usage, the circuitry allowance, and the electric power vendor brand stored in the database 106. For example, if the electricity-engaged duration is from January 2002 to December 2002, the optimum total power rate averaged from January 2002 to December 2002 is calculated and generated. Since TPC is the major electric power vendor brand currently used in Taiwan, the basic power rate, the additional fee for excess usage, and the circuitry allowance all refer to the pricing regulation provided by TPC. Moreover, the analysis module 108 calculates and generates an optimum power rate by analyzing the historical record of the total power rate as well as the basic power rate, the additional fee for excess usage, and the circuitry allowance calculated by TPC. Therefore, by using the contract concluded by using the optimum power rate, the user 102 spends minimum expense in the electricity on the duration from January 2002 to December 2002 (as step s204). Afterwards, the contract generation module 110 generates a contract having an optimum capacity based on the optimum total power rate. Therefore, the user 102 can conclude a new contract with TPC based on the contract having the optimum capacity (as step Finally, the output module 112 outputs the contract to the user 102, so that the user 102 knows the content of the contract (as step s208).

In summary, since the present invention considers using the basic power rate, the additional fee for excess usage, and the circuitry allowance to conclude the contracted capacity, the optimum contracted capacity can be obtained.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. An electric power evaluation system, comprising:
   an input module, used to receive a condition input by a user;
   a database, used to store a historical record of a total power rate, a basic power rate, an additional fee for excess usage, and a circuitry allowance;
   an analysis module, wherein the analysis method calculates and generates an optimum total power rate according to the condition as well as the historical record of the total power rate, the basic power rate, the additional fee for excess usage, and the circuitry allowance;
   a contract generation module, wherein the contract generation module generates a contract having an optimum capacity based on the optimum total power rate; and
   an output module, used to output the contract to the user.

2. The electric power evaluation system of claim 1, wherein the condition comprises an electricity-engaged duration.

3. The electric power evaluation system of claim 1, wherein the database further stores a plurality of electric power vendor brands.

4. The electric power evaluation system of claim 3, wherein the condition comprises one of the electric power vendor brands.

5. The electric power evaluation system of claim 3, wherein each of the electric power vendor brands has a specific pricing regulation.

6. The electric power evaluation system of claim 1, wherein the input module is a keyboard.

7. The electric power evaluation system of claim 1, wherein the input module is a mouse.

8. The electric power evaluation system of claim 1, wherein the database is stored in a storage device.

9. The electric power evaluation system of claim 1, wherein the analysis module is a software stored in a storage device.

10. The electric power evaluation system of claim 1, wherein the analysis module is an Application Specific Integrated Circuit (ASIC).

11. The electric power evaluation system of claim 1, wherein the contract generation module is a software stored in a storage device.

12. The electric power evaluation system of claim 1, wherein the contract generation module is an Application Specific Integrated Circuit (ASIC).

13. The electric power evaluation system of claim 1, wherein the output module is a display device.

14. An electric power evaluation method, comprising:
   receiving a condition input by a user;
   calculating and generating an optimum total power rate according to the condition as well as a historical record of a total power rate, a basic power rate, an additional fee for excess usage, and a circuitry allowance;
   generating a contract having an optimum capacity based on the optimum total power rate; and
   outputting the contract to the user.

15. The electric power evaluation method of claim 14, wherein the condition comprises an electricity-engaged duration.

16. The electric power evaluation method of claim 14, wherein the historical record of the total power rate, the basic power rate, the additional fee for excess usage, and the circuitry allowance are stored in a database.

17. The electric power evaluation method of claim 16, wherein the database further stores a plurality of electric power vendor brands.

18. The electric power evaluation method of claim 17, wherein the condition comprises one of the electric power vendor brands.

19. The electric power evaluation method of claim 17, wherein each of the electric power vendor brands has a specific pricing regulation.

* * * * *